(12) United States Patent
Kuehne et al.

(10) Patent No.: US 8,893,393 B2
(45) Date of Patent: Nov. 25, 2014

(54) LOCK FOR POWER TOOL

(71) Applicants: Brent A Kuehne, Red Lion, PA (US);
Mark D Miller, Fawn Grove, PA (US);
John S Vantran, Parkton, MD (US)

(72) Inventors: Brent A Kuehne, Red Lion, PA (US);
Mark D Miller, Fawn Grove, PA (US);
John S Vantran, Parkton, MD (US)

(73) Assignee: Black & Decker, Inc., Newark, DE (US)

( * ) Notice: Subject to any disclaimer, the term of this patent is extended or adjusted under 35 U.S.C. 154(b) by 0 days.

(21) Appl. No.: 13/846,569

(22) Filed: Mar. 18, 2013

(65) Prior Publication Data

US 2013/0212888 A1 Aug. 22, 2013

Related U.S. Application Data

(63) Continuation of application No. 13/198,881, filed on Aug. 5, 2011, now Pat. No. 8,438,741.

(51) Int. Cl.
*B27B 3/12* (2006.01)
*B25B 1/00* (2006.01)
*B23D 51/02* (2006.01)
*B23D 49/16* (2006.01)
*B25F 5/00* (2006.01)
*B23D 49/00* (2006.01)

(52) U.S. Cl.
CPC ............... *B23D 49/00* (2013.01); *B23D 51/02* (2013.01); *B23D 49/167* (2013.01); *B25F 5/003* (2013.01)
USPC ..................... 30/392; 30/377; 269/6; 269/212

(58) Field of Classification Search
CPC ............ B27B 3/12; B27B 9/02; B27B 11/02; B27B 21/08; B25B 1/00; B25B 1/60; B23D 49/00; B23D 49/16; B23D 51/00; B23D 49/14; B23D 51/04; B23D 49/10; F16D 51/00
USPC ........... 30/392, 377, 375, 371, 374, 376, 393, 30/323, 340; 269/212–216, 3, 99, 228, 269/166, 143; 16/4.5; 248/149, 132, 157; 403/323
See application file for complete search history.

(56) References Cited

U.S. PATENT DOCUMENTS

| 836,303 | A | * | 11/1906 | Christensen ................ 188/67 |
| 3,496,972 | A | * | 2/1970 | Rees ............................. 30/376 |
| 5,154,398 | A | | 10/1992 | Mayfield | |
| 5,593,147 | A | | 1/1997 | Read | |

(Continued)

FOREIGN PATENT DOCUMENTS

| DE | 19925746 A1 | 12/2000 |
| JP | 2005 046970 A | 2/2005 |

*Primary Examiner* — Ghassem Alie
(74) *Attorney, Agent, or Firm* — Sughrue Mion, PLLC

(57) ABSTRACT

A power tool including a sliding member slidably received in the power tool and a pair of lock plates, each of the pair of lock plates including an opening, and the lock plates being configured such that the sliding member slides within the opening. First ends of each of the lock plates are pivotably attached to a support at a first side of the sliding member, and second ends of each of the lock plates being biased toward one another at an opposite side of the sliding member. A first contact portion of the lock plate contacts a first surface of the sliding member at the first side of the sliding member, and a second contact portion of the lock plate contacts a second surface of the sliding member at the opposite side of the sliding member, wherein the sliding member is secured with respect to the support.

19 Claims, 19 Drawing Sheets

(56) References Cited

U.S. PATENT DOCUMENTS

| | | | |
|---|---|---|---|
| 6,338,475 B1 * | 1/2002 | Ping | 269/6 |
| 6,382,608 B1 | 5/2002 | Michell | |
| 6,648,315 B1 | 11/2003 | Lee | |
| 6,671,969 B2 | 1/2004 | Phillips et al. | |
| 6,896,248 B1 * | 5/2005 | Andulics | 269/3 |
| 7,086,631 B2 * | 8/2006 | Lee et al. | 248/161 |
| 7,255,108 B1 * | 8/2007 | Loughlin | 128/848 |
| 7,641,183 B2 | 1/2010 | Fuller et al. | |
| 7,896,322 B2 | 3/2011 | Geler et al. | |
| 2003/0206779 A1 | 11/2003 | Kopras et al. | |
| 2010/0084798 A1 * | 4/2010 | Geier et al. | 269/6 |

* cited by examiner

LOCK FOR POWER TOOL

This application is a continuation of U.S. application Ser. No. 13/198,881, filed Aug. 5, 2011, the entire disclosure of which is herein incorporated by reference.

FIELD OF THE INVENTION

The present invention generally relates to a power tool including a lock for locking a sliding member. More particularly, the invention can be provided as a lock for securing a sliding member that is mounted to a shoe of a saw, such as a reciprocating saw.

BACKGROUND OF THE INVENTION

A power saw, such as a reciprocating saw, can be provided with a shoe that assists in stabilizing the saw during cutting by resting against a workpiece. The shoe can be pivotably mounted so that it can adjust to be square against the workpiece. Moreover, the axial position of the shoe relative to a saw blade can be adjusted by sliding a post into or out of the receiving bore. For example, U.S. Pat. No. 6,671,969 ("US '969"), which is incorporated herein by reference, discloses such a reciprocating saw in which the axial position of the shoe relative to a saw blade is adjusted in this way.

In the reciprocating saw of US '969, the post includes a plurality of spaced apart detents. As such, the possible axial positions of the shoe are restricted by the spacing between the detents. Moreover, the reciprocating saw of US '969 uses a locking mechanism with a lever that is rotated by the user's hand. A simpler locking mechanism that allows for more precise axial positioning would be beneficial.

SUMMARY OF THE INVENTION

According to one aspect of the invention, a power tool includes a sliding member slidably received in the power tool; a support; a biasing member; and a pair of lock plates, each of the pair of lock plates including an opening, and the lock plates being configured such that the sliding member slides within the opening. First ends of each of the lock plates are pivotably attached to the support at a first side of the sliding member, and second ends of each of the lock plates being biased toward one another at an opposite side of the sliding member. Each of the pair of lock plates is biased by the biasing member such that a first contact portion of the lock plate contacts a first surface of the sliding member at the first side of the sliding member, and a second contact portion of the lock plate contacts a second surface of the sliding member at the opposite side of the sliding member, wherein the sliding member is secured with respect to the support.

According to another aspect of the invention, a saw includes a saw blade extending from the saw; a sliding member slidably received in the power tool; a support; a biasing member; and a pair of lock plates, each of the pair of lock plates including an opening, and the lock plates being configured such that the sliding member slides within the opening. First ends of each of the lock plates are pivotably attached to the support at a first side of the sliding member, and second ends of each of the lock plates being biased toward one another at an opposite side of the sliding member. Each of the pair of lock plates is biased by the biasing member such that a first contact portion of the lock plate contacts a first surface of the sliding member at the first side of the sliding member, wherein the sliding member is secured with respect to the support. A longitudinal axis of each lock plate is offset from an axis of rotation of the lock plate's pivot point The saw can be a reciprocating saw.

BRIEF DESCRIPTION OF THE DRAWINGS

The above and other aspects of the present invention will become more apparent from the following description of exemplary embodiments, taken in conjunction with the accompanying drawings of which.

DETAILED DESCRIPTION OF THE EXEMPLARY EMBODIMENTS

The matters defined in the description are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
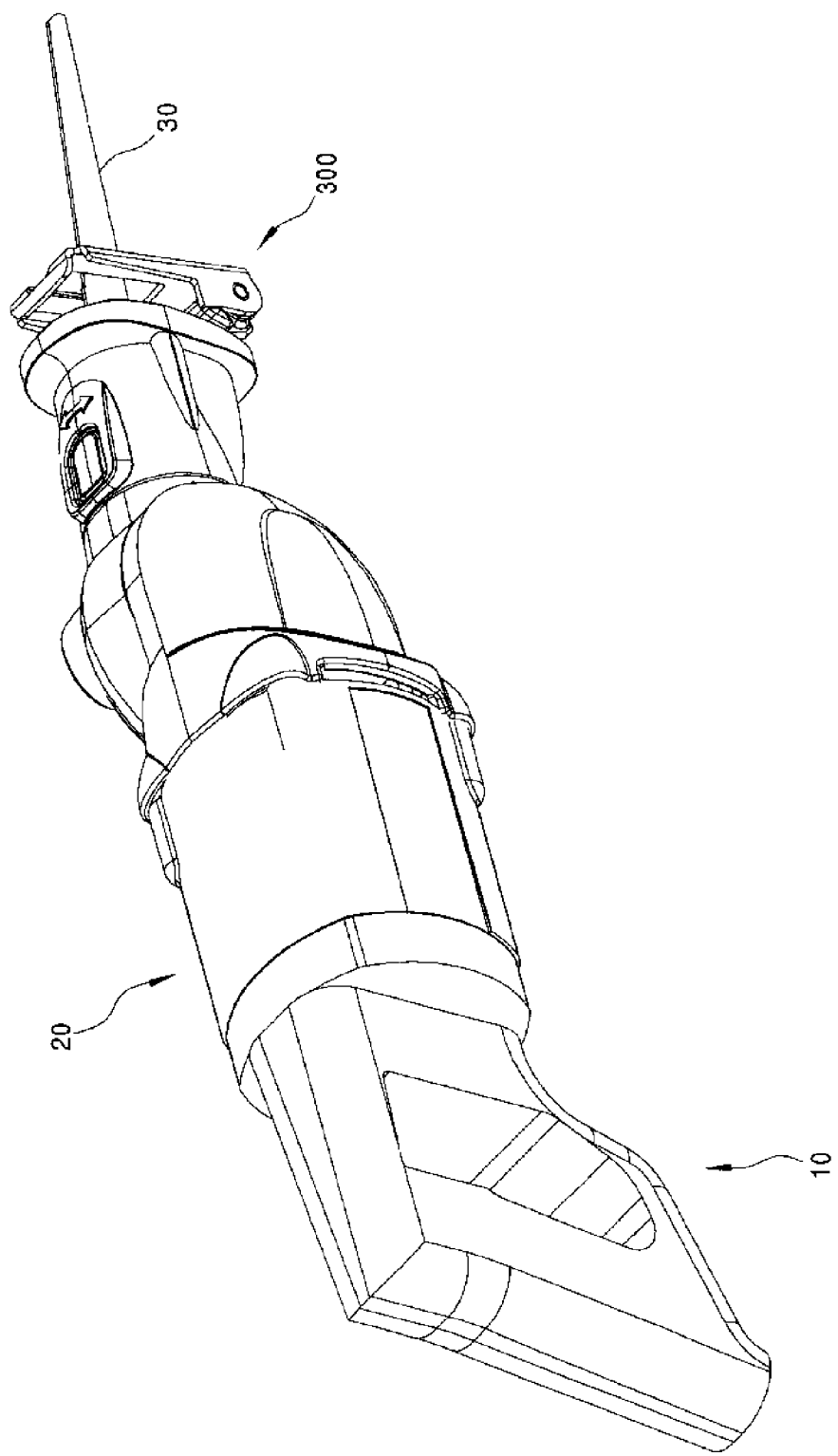
FIG. 1 depicts a reciprocating saw according to a first exemplary embodiment of the invention.

FIG. 1 depicts a first exemplary embodiment of a reciprocating saw. The reciprocating saw includes a handle assembly 10 and a motor assembly 20. The handle assembly 10 and the motor assembly 20 are depicted schematically since their details are not important for understanding the invention. In fact, the handle assembly 10 and the motor assembly 20 could be of any appropriate design, as will be recognized by those skilled in the art. Typically, the handle assembly 10 will include a trigger switch for actuating the tool, and possibly a trigger lock. The motor assembly 20 includes a rotary electric motor. Either a cordset or a battery attaches to the handle assembly 10 or the motor assembly 20 to provide power to the motor.

A saw blade 30 extends from the saw and has a reciprocating motion which defines a reciprocating motion axis. The reciprocating motion axis is generally parallel to the saw blade's longitudinal axis. In addition, the saw blade 30 may have other components of motion such as occurs in an orbital action reciprocating saw. A shoe assembly 300 rests against the workpiece being cut to help stabilize the saw.

Figure 2:
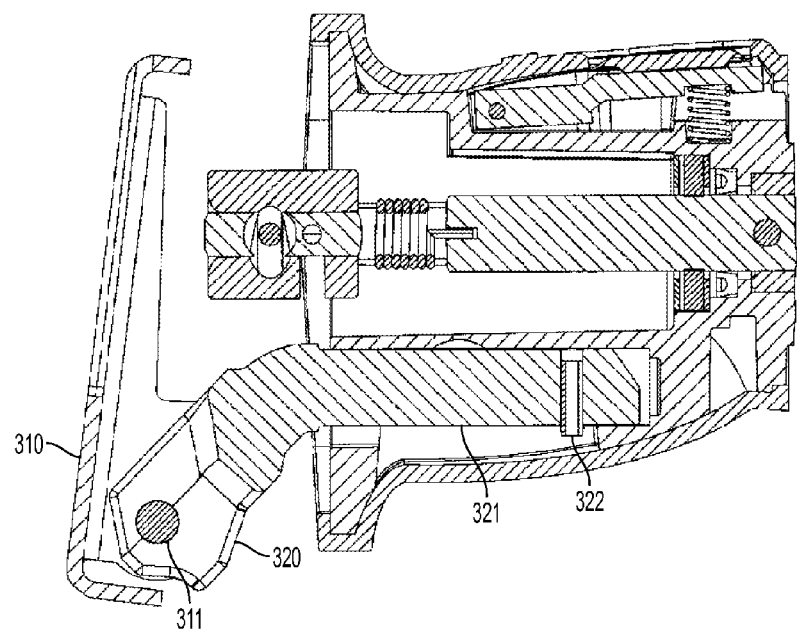
FIGS. 2 and 3 depict a shoe assembly in accordance with the first exemplary embodiment of the invention.
Figure 3:
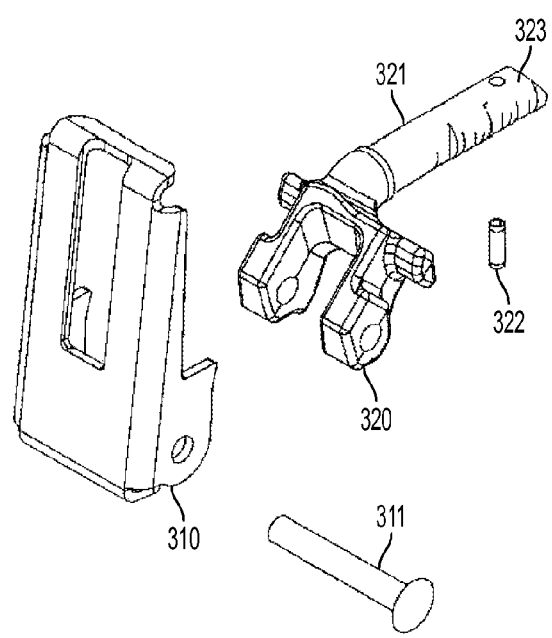

With reference to FIGS. 2 and 3, the shoe assembly 300 will be described in detail. However, the invention is not limited to use with a shoe assembly. The shoe assembly 300 comprises a shoe 310 mounted on a stem 320. The shoe 310 can be pivotally mounted to the stem 320 via a rivet 311. The shoe 310 assists in stabilizing the saw during cutting by resting against the workpiece. Because it is pivotally mounted, the shoe 310 can adjust to be square against the workpiece. As shown in FIGS. 2 and 3, a sliding member 321 of stem 320 is mounted with a sliding fit in a receiving bore formed in the front of the saw. A pin 322 is mounted in a bore formed in sliding member 321 and protrudes slightly from one side of the sliding member 321. An axial groove matching the protrusion of the pin 322 from the sliding member 321 is formed in the receiving bore in the saw so that the sliding member 321 cannot rotate inside of the receiving bore. Thus, the shoe 310 will always be in the correct angular orientation relative to the saw blade 30. The sliding member is not limited by shape and can be a post having a generally cylindrical shape or any appropriate form such as a square bar, or a flat or stamped plate. The receiving bore can be easily adapted to fit the shape of the sliding member.

The axial position of the shoe 310 relative to the saw blade 30 can be adjusted by sliding the sliding member 321 into or out of the receiving bore in the saw. Axial adjustment of shoe 310 adjusts the depth to which the saw blade 30 extends through the workpiece. Axial adjustment of shoe 310 also exposes different areas of the saw blade 30 to cutting in order to extend the life of the saw blade. The sliding member of this embodiment can be slid into and or out of the receiving bore without the use of tools.

FIGS. 4-9 show the details of a lock 400, which secures the sliding member 321 with respect to a support 410, in accordance with the first exemplary embodiment.

Figure 4:
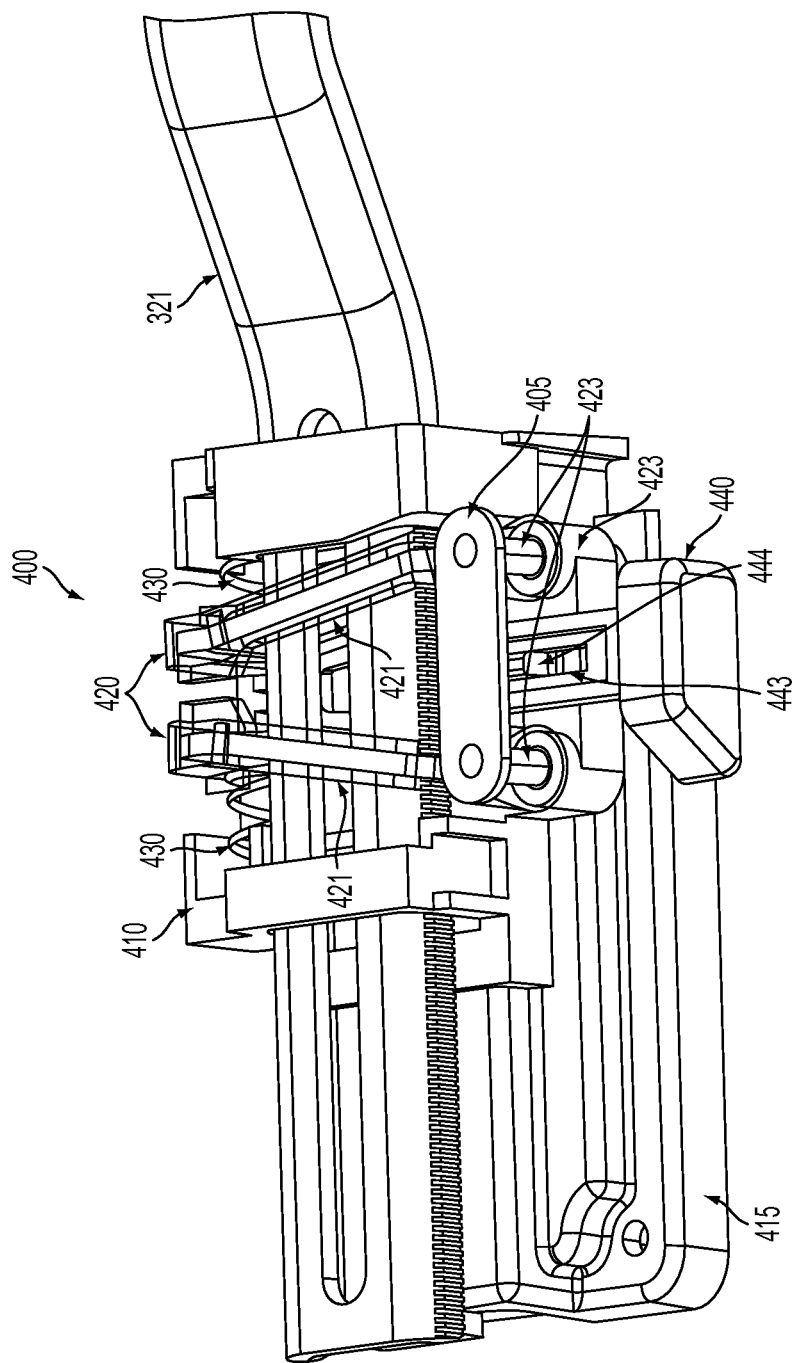
FIG. 4 depicts a perspective view of a lock in accordance with the first exemplary embodiment.

As shown in FIG. 4, the lock 400 includes a pair of lock plates 420, a biasing member 430, a release button 440, the support 410, an upper bearing support 415 of the saw, and the sliding member 321.

The lock plates 420 can be made entirely of plastic, entirely of metal, or can include an internal metal portion (such a steel) with a plastic portion surrounding the metal portion. The plastic portion can be, for example, glass filled nylon. The internal metal portion can be provided within the plastic portion by an insert molding process. The sliding member 321 can be a metal, such as steel, or more particularly Harden Steel. However, the invention is not limited to the materials of these structures.

Figure 7A:
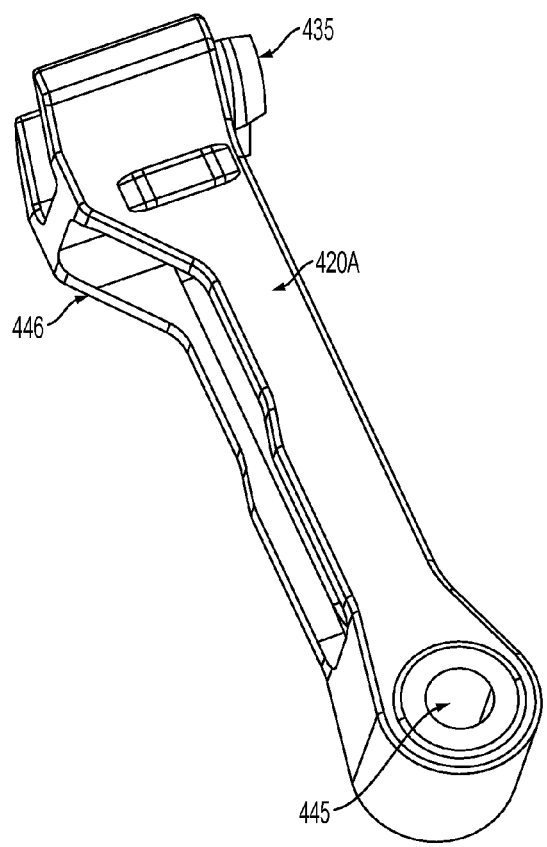
FIGS. 7A and 7B show lock plates of the lock shown in FIGS. 4-6.
Figure 7B:
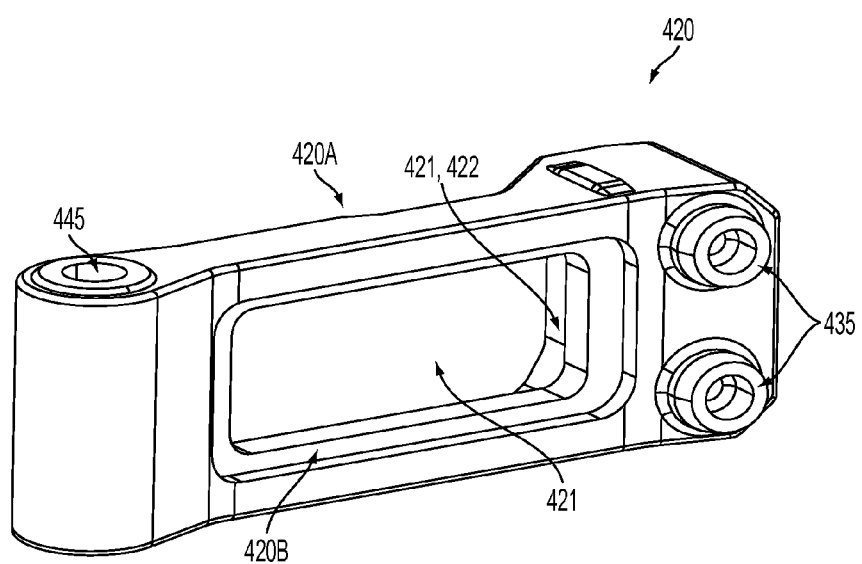

In the first exemplary embodiment, a shown in FIGS. 7A and 7B, the lock plates 420 include a plastic portion 420A and an internal metal portion 420B. FIG. 7A shows the plastic portion 420A including a cam surface 446 that contacts a corresponding cam surface of a protrusion 441 of a release button 440, which is discussed below with respect to the second exemplary embodiment. The plastic portion 420A also includes two support posts 435 that support the biasing member 430 and a hole 445 through within which a pivot pin 423 is provided. The internal metal portion 420B includes a contact portion 421, 422, which is discussed below.

In this exemplary embodiment, the support 410 is separate structure that is attached to the upper bearing support 415 of the saw. However, the support can be integrally formed with the upper bearing support 415, and thus the saw's body.

Figure 5:
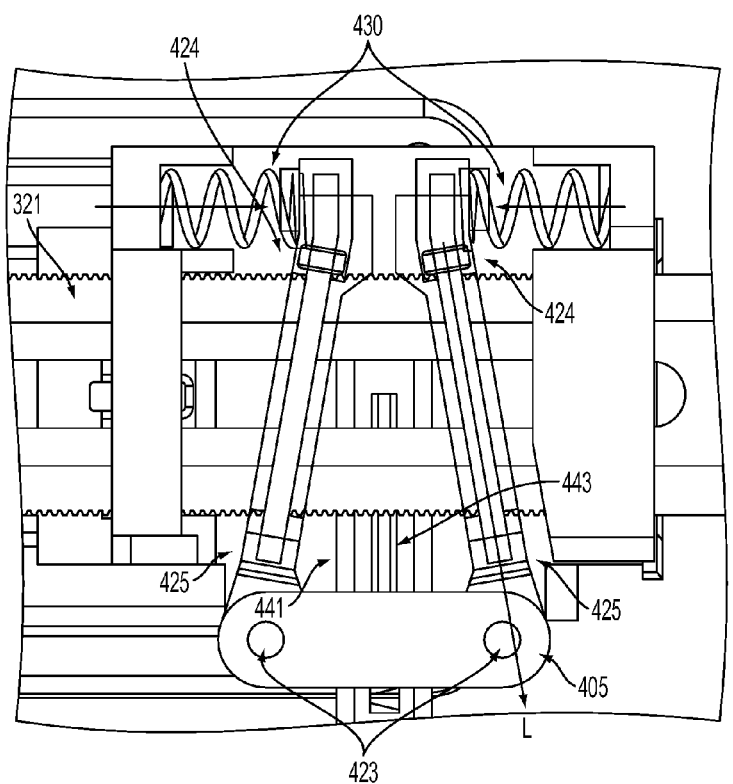
FIG. 5 depicts a side view of the lock.

Each of the pair of lock plates 420 includes an opening 421 (see FIG. 7B). The lock plates 420 are configured such that the sliding member 321 slides within the opening 421 to adjust the axial position of the shoe 300. As shown in FIG. 5, first ends 425 of each of the lock plates 420 are pivotably attached to the support 410 by pivot pins 423 at a first side of the sliding member 321. Second ends 424 of each of the lock plates are biased toward one another at an opposite side of the sliding member 321 by the biasing member 430. The pivot pins 423 are provided between the support 415 and a support plate 405.

In this embodiment, the biasing member 430 is two pairs of compression springs attached to the support 410. However, the biasing member 430 is not limited to the exemplary embodiment can also be, for example, a single pair of compression springs, pairs of torsion springs or a single torsion provided between the lock plates 420 at the first side (i.e., the side closer to the pivot points of the lock plates 420) of the sliding member 321.

Figure 6:
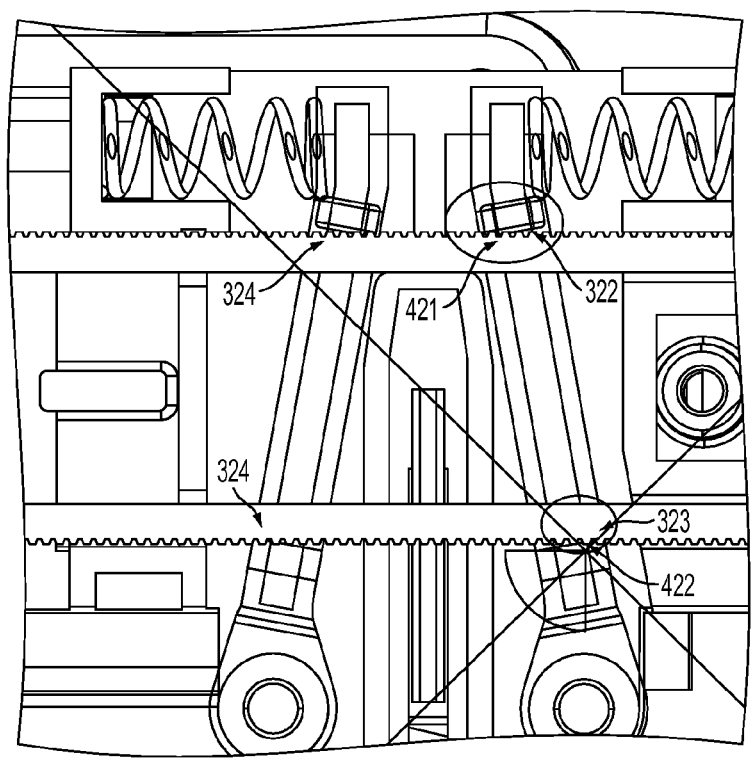
FIG. 6 is an enlarged view of the lock shown in FIG. 5.

As shown in FIG. 6, the pair of lock plates 420 are biased by the biasing member 430 such that a first contact portion 421 of the lock plate 420 contacts a first exterior surface 322 of the sliding member 321, and a second contact portion 422 of the lock plate 420 contacts a second exterior surface 323 of the sliding member 321 to secure the sliding member 321 in place.

In the exemplary embodiment shown in FIG. 6, the two contact portions 421, 422 are formed at opposite interior sides of the opening 421 in the lock plate 420. Each contact portion 421, 422 is a corner portion that is wedged within small indentations 324 provided on exterior surfaces 322, 323 of the sliding member 321. A wedging action across the corner portion 421, 422 locks the sliding member 321 in place. The invention is not limited to surfaces 322, 323 having indentations, however. Instead, the surfaces 322, 323 can be substantially smooth or textured so that a friction force between the contact portions 421, 422 of the lock plates 420 and the surfaces 322, 323 of the sliding member secures the sliding member 321 in place. Referring to FIG. 6, the lower contact portion 422 at the right prevents the sliding member 321 from moving to the left, while the upper contact portion 421 at the right prevents the sliding member 321 from moving to the right. The lower contact portion at the left (not labeled in FIG. 6) prevents the sliding member 321 from moving to the right, while the upper contact portion at the left (unlabeled) prevents the sliding member 321 from moving to the left.

In the exemplary embodiment, as shown in FIG. 5, a longitudinal axis L at the center of each lock plate 420 is offset from an axis of rotation of the lock plate's pivot pin 423. This offset allows the surface of each lock plate 420 to be displaced away from the surface 323 of the sliding member 321. The sliding member 321 can then freely slide, allowing a user to adjust the position of the shoe 300 with respect to the saw blade 30.

Figure 8:
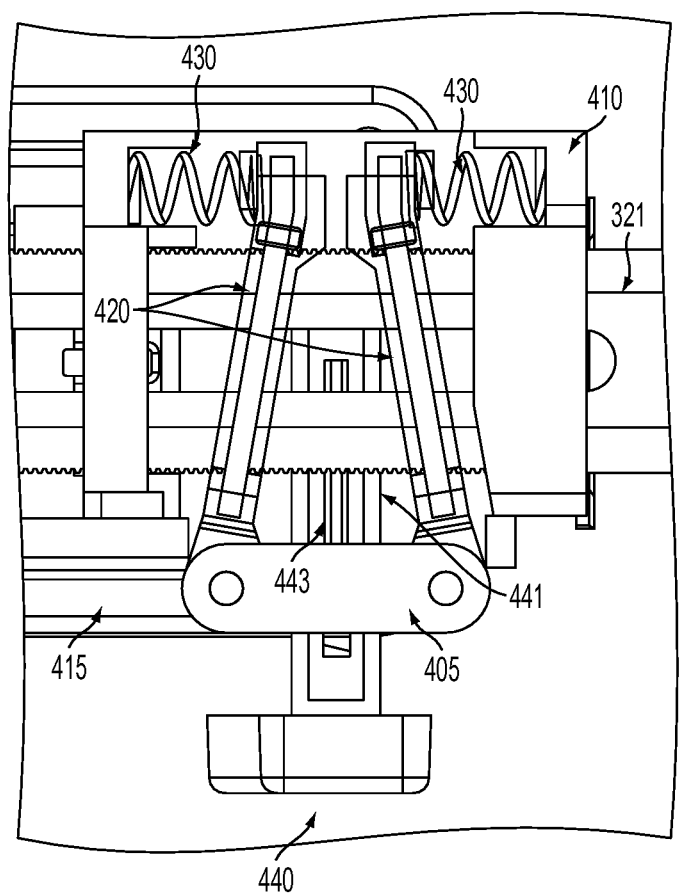
FIG. 8 depicts the lock in a secured position in which the sliding member is secured to the support.
Figure 9:
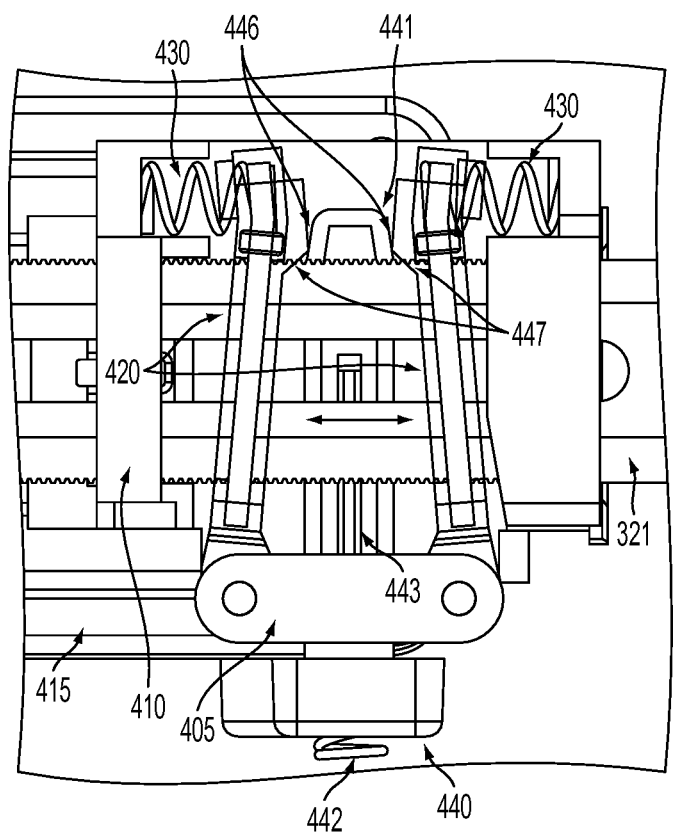
FIG. 9 depicts the lock in a position in which the sliding member is released with respect to the support.

Referring to FIGS. 8 and 9, the release button 440 is provided at the first side (i.e., the side closer to the pivot points of the lock plates 420) of the sliding member 321. The release button 440 includes a protrusion 441 that extends between the lock plates 420. When the release button 440 is pushed inward, the protrusion 441 is provided between the lock plates 421 and cam surfaces at a distal end of the protrusion push against cam surfaces of the lock plates 421, pushing the lock plates away from one another, and overcoming a force of the biasing member 430. This releases the sliding member 321 with respect to the support, as shown in FIG. 8. The protrusion 441 includes a slot 443 within which at least one rib 444 (see FIGS. 4 and 5) extending from the support 410 slides. The at least one rib 445 and slot 444 provide support for and prevent rotation of the release button 440.

The release button 440 also includes a release biasing member 442 that biases the release button 440 to a position in which the protrusion 441 does not contact the lock plates 420. The release biasing member in the exemplary embodiments is a compression spring. However, the invention is not limited in this aspect and the biasing member can be another structure, such as a torsion spring.

Figure 10A:
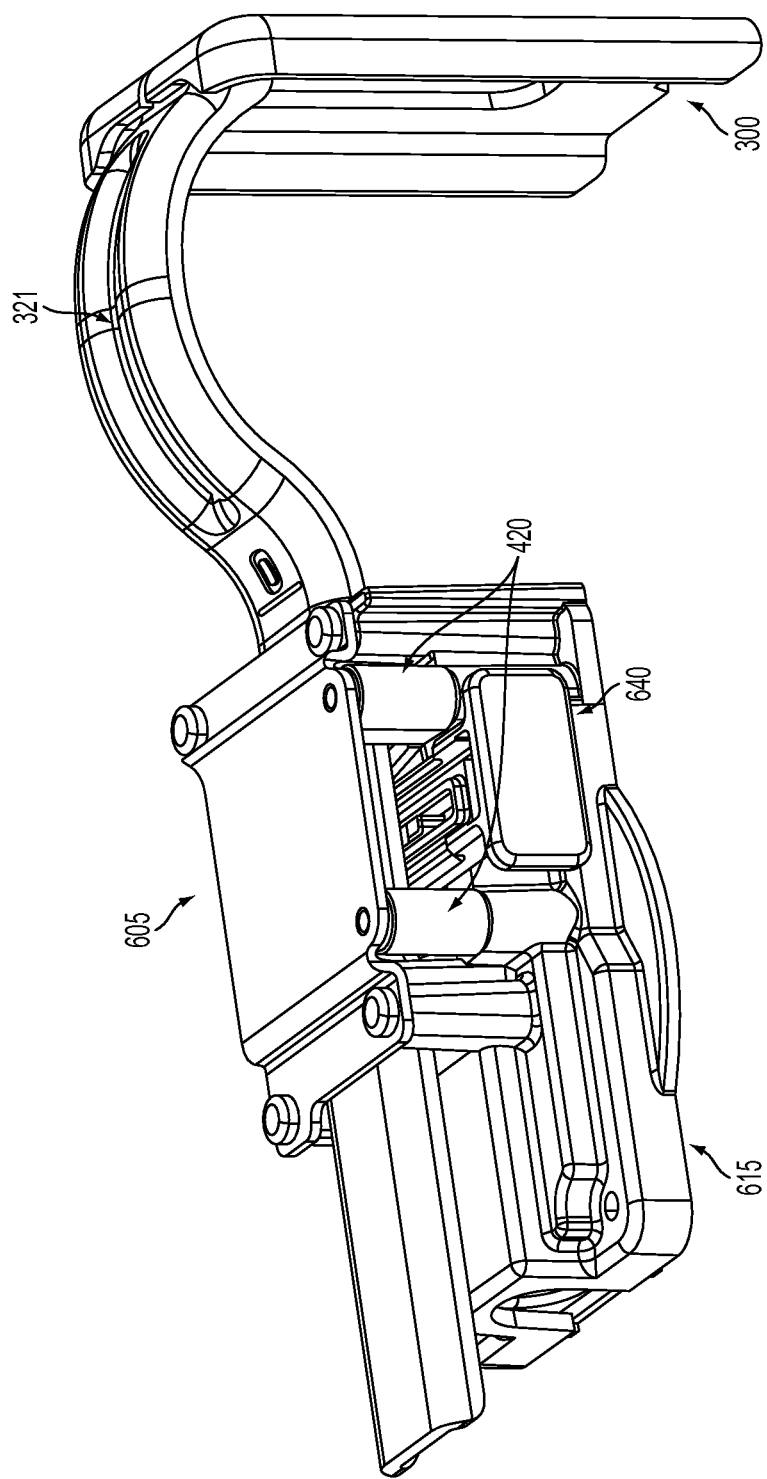
FIGS. 10A to 10C show a second exemplary embodiment of the invention.
Figure 10B:
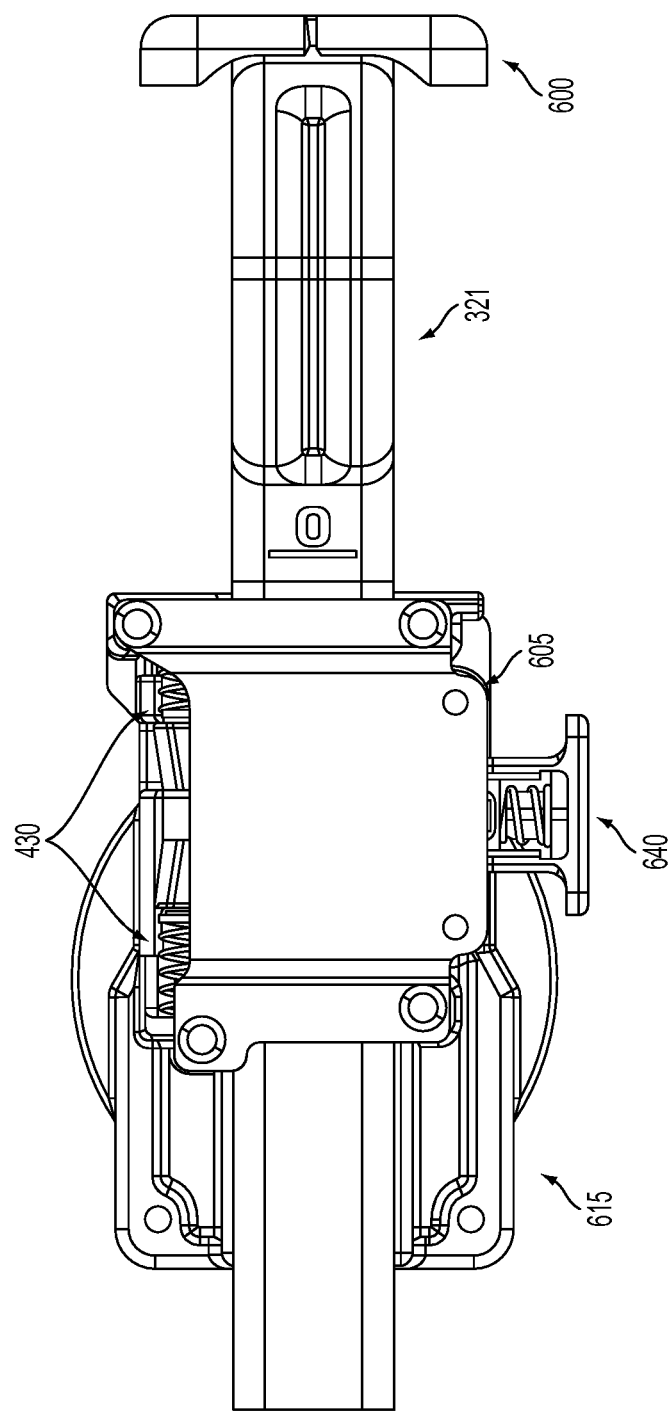
Figure 10C:
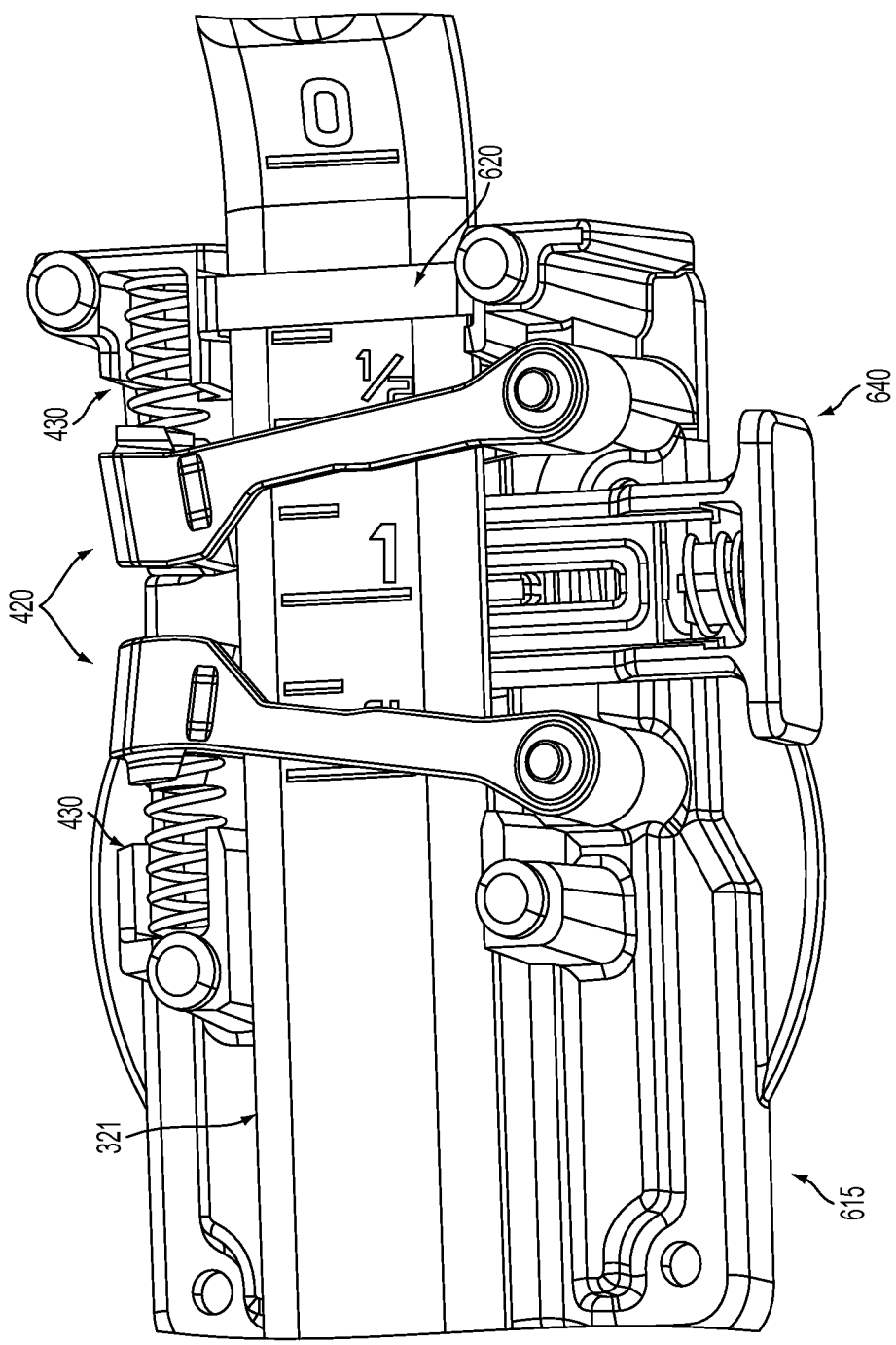

FIGS. 10A to 10C show a second exemplary embodiment of the invention. The features of the second exemplary embodiment are the same as those of the first exemplary embodiment, except for the features discussed below.

In this embodiment, the structure that supports the lock plates 420 is integrally formed as a part of the upper bearing support 615. Moreover, a large support plate 605 is used instead of the smaller support plate 405 shown in FIG. 4. The support plate 605 is attached to the upper bearing support 615 by screws.

As shown in FIG. 10C (with plate 605 and part of the biasing member 430 removed), as in the first exemplary embodiment, the lock plates 420 are biased by the biasing member 430 to secure the contact portions 421, 422 against contact surfaces of the sliding member 321. A felt seal 620 is provided to prevent debris from entering the structures of the lock.

Figure 11A:
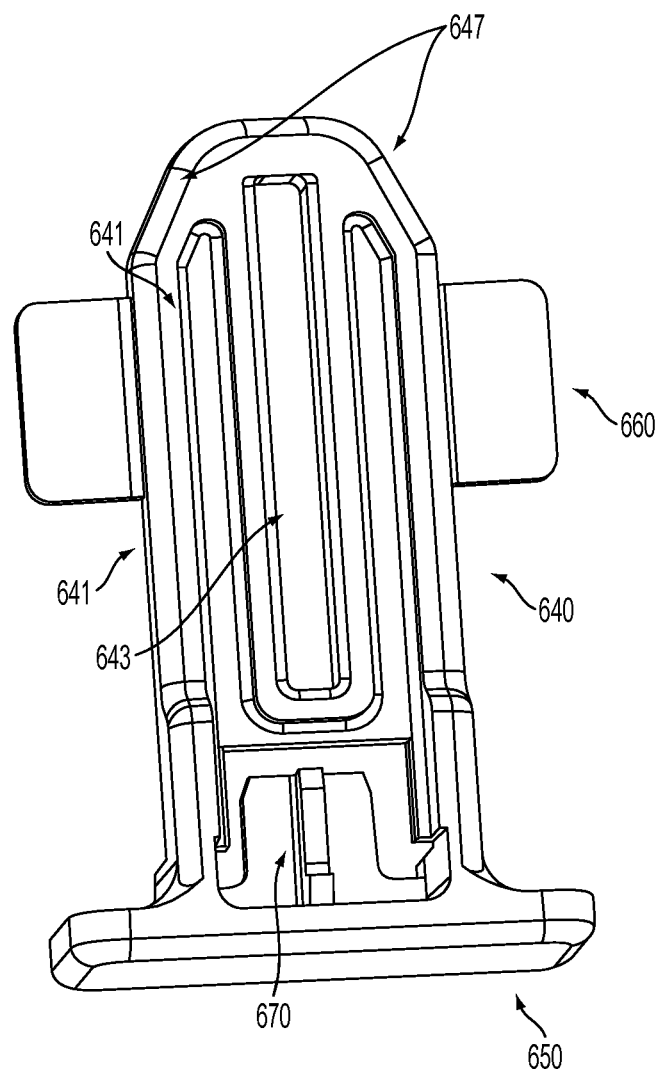
FIGS. 11A to 11D show a lock release button and protrusion according to a second exemplary embodiment of the invention.
Figure 11B:
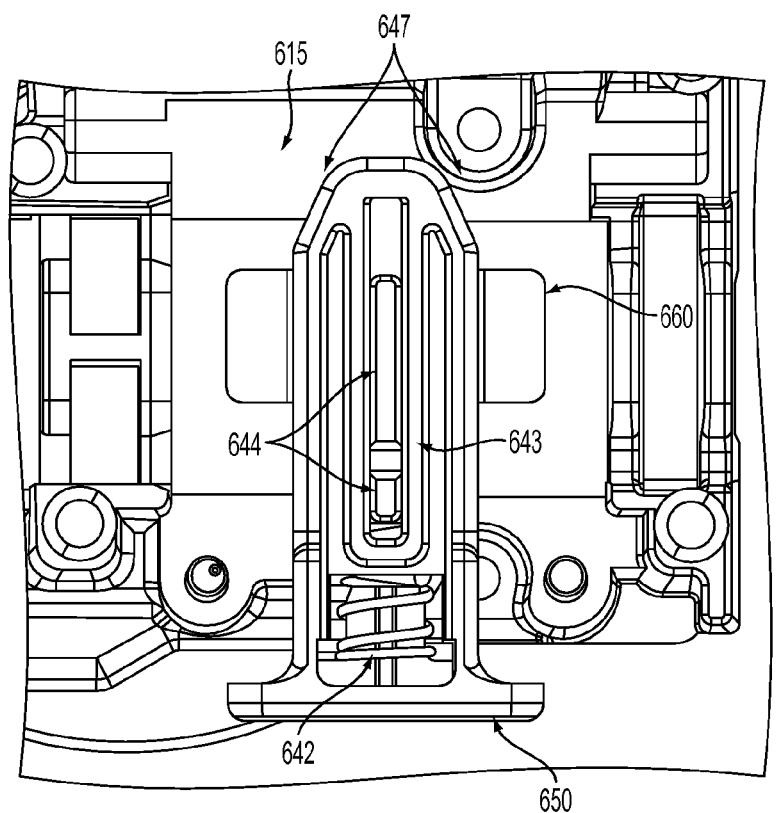
Figure 11C:
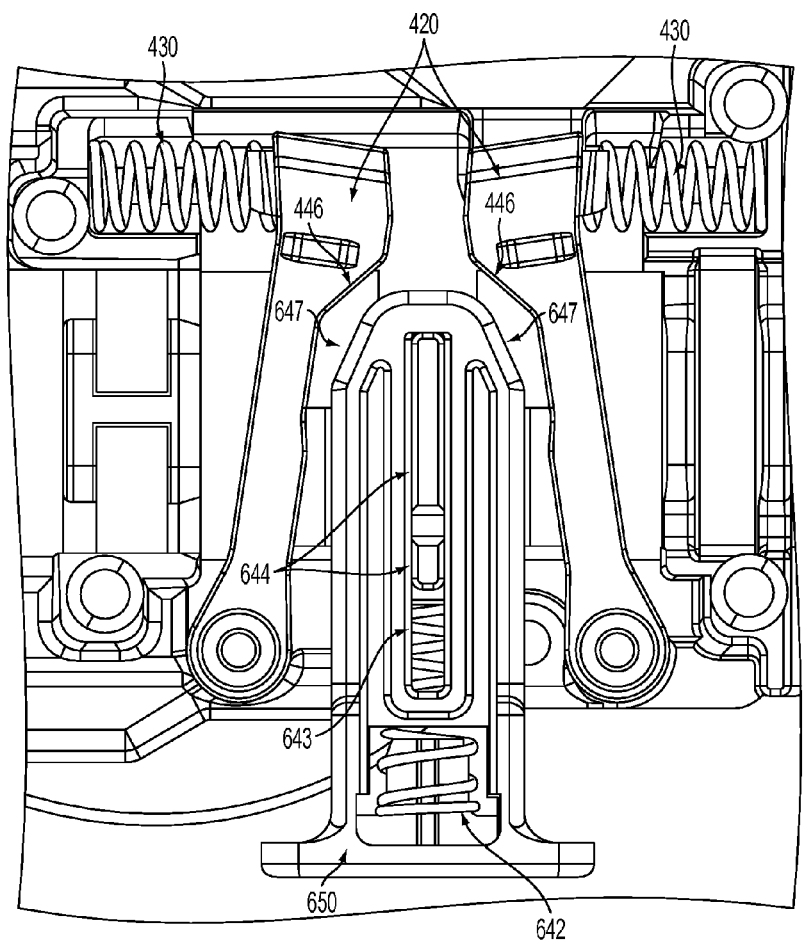
Figure 11D:
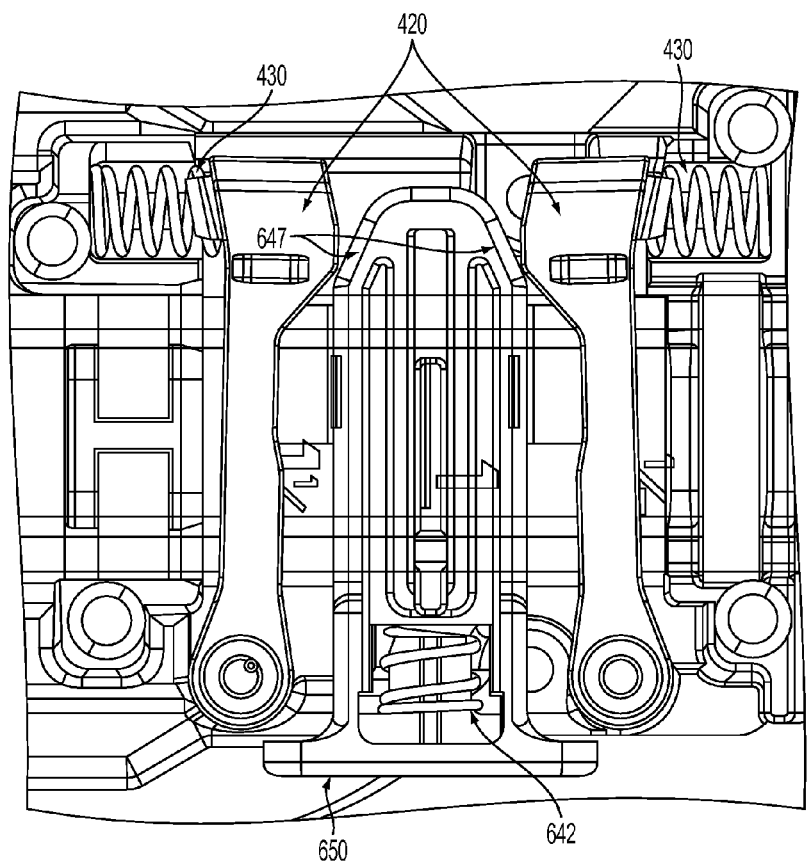

FIG. 11A shows a release button 640 of the second exemplary embodiment. As in the first embodiment, the release button 640 includes a protrusion 641 and cam surfaces 647 that contact and push corresponding cam surfaces 446 of the lock plates 420. FIG. 11C shows the protrusion 641 approaching the lock plates 420, and FIG. 11D shows the lock after the lock plates 420 have been pushed, allowing the sliding member 321 to slide freely. The release button 640 includes a contact portion 650 that is pushed by a user to release the lock plates 420.

As in the first exemplary embodiment, a slot 643 is provided within the protrusion for engaging at least one rib 644 extending from the upper bearing support 415, and as in the first exemplary embodiment, a release biasing member 642 biases the release button 640 to a position in which the protrusion 641 does not contact the lock plates 420. In this exemplary embodiment, the release biasing member 642 is provided on a support 670 and is secured between a lower one of the ribs 644 and the support 670. The protrusion 641 of the release button 640 also includes extensions 660, which slide on a surface of the upper bearing support 615 to stabilize the release button 640.

Figure 12A:
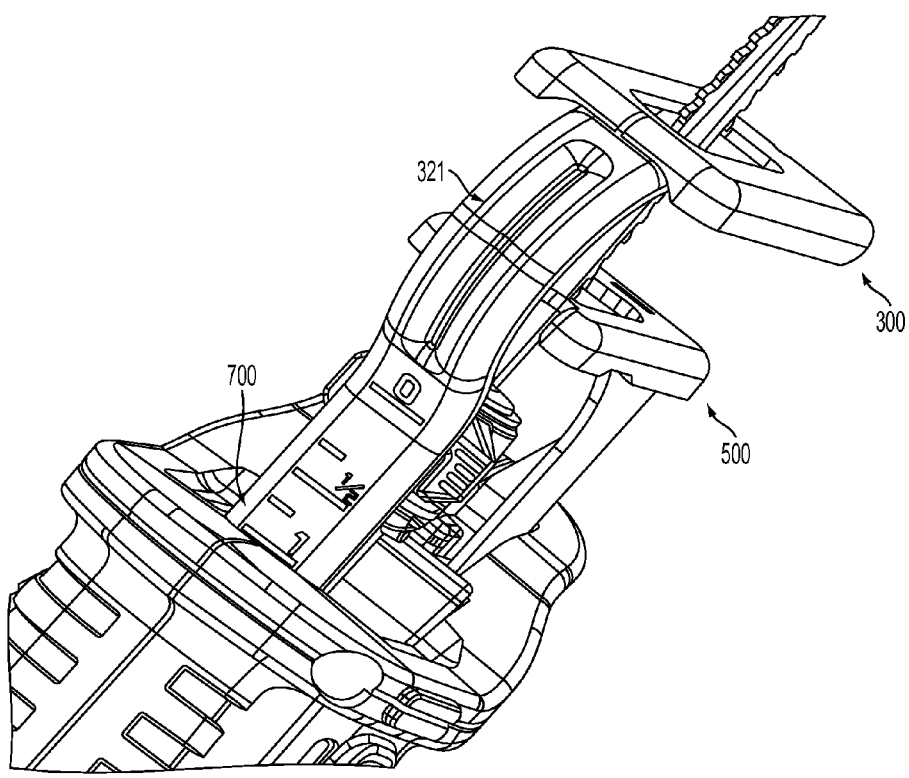
FIGS. 12A and 12B show features for adjustment of the shoe assembly with respect to the second exemplary embodiment.
Figure 12B:
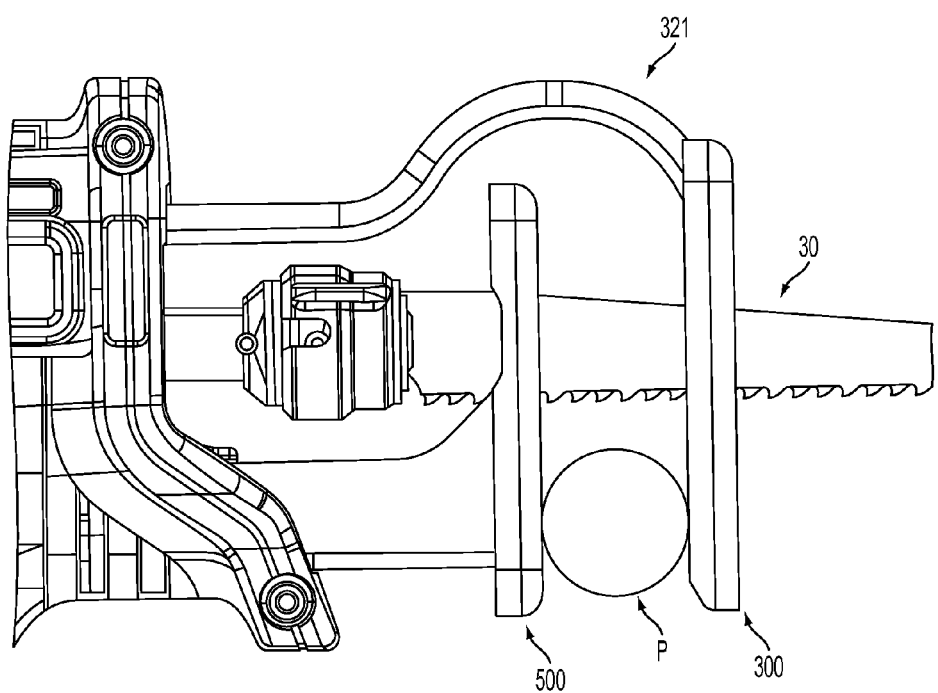

FIGS. 12A and 12B show features for adjustment of the shoe assembly with respect to the second exemplary embodiment. As shown in FIG. 12A, increments are indicated on the sliding member 321. These increments correspond to a distance between a fixed shoe 500 and the movable shoe 300. For example, the increment indicated in FIG. 12A is 1 inch and the outside diameter of a pipe P shown in FIG. 12B is also 1 inch. As shown in FIG. 12A, by aligning the increment on the sliding member 321 with a rib 700 on the saw's housing, a user can readily determine the distance between the fixed shoe 500 and the movable shoe 300. The distance between the fixed shoe 500 and the movable shoe 300 is adjusted by releasing the sliding member 321 and changing the position of the movable shoe 300. For example, FIG. 12B shows the shoes 300, 500 of the saw secured around the pipe P.

The invention has been described and illustrated several exemplary embodiments. It will be appreciated, however, that the invention can be applied otherwise, and that the dimensions, materials and other variables may be altered to suit individual design considerations without departing from the spirit and scope of the present invention.

What is claimed is:

1. A power tool, comprising:
   a sliding member slidably received in the power tool;
   a support;
   a biasing member; and
   a pair of lock plates,
   first ends of each of the lock plates being pivotably attached to the support at a first side of the sliding member, and second ends of each of the lock plates being biased toward one another at an opposite side of the sliding member,
   each of the lock plates being biased by the biasing member such that a first contact portion of the lock plate contacts a first surface of the sliding member at the first side of the sliding member, and a second contact portion of the lock plate contacts a second surface of the sliding member at the opposite side of the sliding member, wherein the sliding member is secured with respect to the support.

2. The power tool according to claim 1, wherein a longitudinal axis of each lock plate is offset from an axis of rotation of the lock plate's pivot point.

3. The power tool according to claim 1, further comprising:
   a shoe for bearing against a workpiece, the shoe extending from the power tool and mounted to the sliding member.

4. The power tool according to claim 3, further comprising a release button provided at the opposite side of the sliding member, the release button including a protrusion,
   wherein, when the lock button is pressed, the protrusion pushes the lock plates, overcoming a force of the biasing member and releasing the sliding member with respect to the support.

5. The power tool according to claim 4, wherein the release button includes a release biasing member that biases the release button to a position in which the protrusion does not contact the lock plates.

6. The power tool according to claim 2, wherein the biasing member comprises at least one torsion spring.

7. The power tool according to claim 2, wherein the biasing member comprises at least one compression spring.

8. The power tool according to claim 1, wherein the first and second surfaces of the sliding member comprises a plurality of indentations.

9. The power tool according to claim 1, wherein each of the first and second surfaces of the sliding member comprises a textured surface.

10. The power tool according to claim 1, wherein each of the first and second contact portions comprises a corner portion.

11. A saw, comprising:
    a saw blade extending from the saw;
    a sliding member slidably received in the saw;
    a support;
    a biasing member; and
    a pair of lock plates, and
    a shoe for bearing against a workpiece, the shoe extending from the saw and mounted to the sliding member, first ends of each of the lock plates being pivotably attached to the support at a first side of the sliding member, and second ends of each of the lock plates being biased toward one another at an opposite side of the sliding member, each of the lock plates being biased by the biasing member such that a first contact portion of the lock plate contacts a first surface of the sliding member at the first side of the sliding member, and a second contact portion of the lock plate contacts a second surface of the sliding member at the opposite side of the sliding member, wherein the sliding member is secured with respect to the support.

12. The saw according to claim 11, wherein the saw is a reciprocating saw, and the saw blade is a saw blade having a reciprocating motion.

13. The saw according to claim 12, wherein a longitudinal axis of each lock plate is offset from an axis of rotation of the lock plate's pivot point.

14. The saw according to claim 12, further comprising a release button provided at the opposite side of the sliding member, the release button including a protrusion, wherein, when the lock button is pressed, the protrusion pushes the lock plates, overcoming a force of the biasing member and releasing the sliding member with respect to the support.

15. The saw according to claim 14, wherein the release button includes a release biasing member that biases the release button to a position in which the protrusion does not contact the lock plates.

16. The saw according to claim 12, wherein the biasing member comprises at least one torsion spring.

17. The saw according to claim 12, wherein the biasing member comprises at least one compression spring.

18. The saw according to claim 12, wherein the first and second surfaces of the sliding member comprises a plurality of indentations.

19. The saw according to claim 12, wherein each of the first and second surfaces of the sliding member comprises a textured surface.

* * * * *